United States Patent
Shih

(12) United States Patent (10) Patent No.: US 6,746,013 B2
Shih (45) Date of Patent: Jun. 8, 2004

(54) AUTOMATIC DOCUMENT FEEDER

(75) Inventor: Wei-Kuo Shih, Taipei Hsien (TW)

(73) Assignee: Silitek Corporation, Taipei (TW)

( * ) Notice: Subject to any disclaimer, the term of this patent is extended or adjusted under 35 U.S.C. 154(b) by 111 days.

(21) Appl. No.: 10/102,843

(22) Filed: Mar. 22, 2002

(65) Prior Publication Data

US 2003/0094746 A1 May 22, 2003

(30) Foreign Application Priority Data

Nov. 16, 2001 (TW) .................................. 90219734 U

(51) Int. Cl.⁷ .............................................. B65H 29/20
(52) U.S. Cl. ...................... 271/186; 271/65; 271/307; 271/291
(58) Field of Search ...................... 271/186, 65, 301, 271/291

(56) References Cited

U.S. PATENT DOCUMENTS

| | | | | |
|---|---|---|---|---|
| 4,761,001 A | * | 8/1988 | Hayakawa et al. | 271/3.01 |
| 4,921,239 A | * | 5/1990 | Okui et al. | 271/186 |
| 5,211,386 A | * | 5/1993 | Baba | 271/3.01 |
| 5,303,017 A | * | 4/1994 | Smith | 399/403 |
| 5,317,377 A | * | 5/1994 | Rubscha et al. | 399/401 |
| 5,597,153 A | * | 1/1997 | Maruyama et al. | 271/4.1 |
| 6,047,959 A | * | 4/2000 | Baba et al. | 271/3.01 |
| 6,513,805 B2 | * | 2/2003 | Takida et al. | 271/291 |

* cited by examiner

*Primary Examiner*—Donald P. Walsh
*Assistant Examiner*—Kaitlin Joerger
(74) *Attorney, Agent, or Firm*—Birch, Stewart, Kolasch & Birch, LLP

(57) ABSTRACT

An automatic document feeder is combined with an optical machine module, and feeds a document to be scanned into the scanning area so that the optical machine module can capture the image on the document. The automatic document feeder according to the invention is designed so that single-sided and double-sided scanning of a manuscript can be attained. It mainly comprises a delivery route that can feed a manuscript through the scanning area, a return route and guiding-out route respectively connected with the delivery route. The manuscript can come out of the exit to complete single-sided scanning after passing through the scanning area. Or, the manuscript can be turned over to its other side and guided back to the delivery route to pass through the scanning area again to process the second scanning. Finally, the manuscript is guided out of the exit and the double-sided image capture is completed.

10 Claims, 4 Drawing Sheets

AUTOMATIC DOCUMENT FEEDER

BACKGROUND OF THE INVENTION

The invention relates to an automatic document feeder (ADF), and more particularly to an automatic document feeder that combines with office machines such as copy machines, scanners and fax machines to provide single-sided and double-sided image scanning.

The automatic document feeder is a machine that can combine with a copy machine, scanner, fax machine and the like, and can continuously process copying, scanning or facsimile on double-sided document paper. It does not require manual work. Consequently, efficiency is increased.

The automatic document feeder can be classified into two kinds, one is the single-sided scanning feeder, and the other is the double-sided scanning feeder. Regardless of whether the double-sided scanning feeder is used with a copy machine or a scanner, it can be divided into three types of feeders as follows:

(1) Double-sided copying or scanning attained by using two sets of optical structures. An optical structure is disposed above and below the delivery route established in the automatic document feeder. The upper and lower optical structures can simultaneously process image capture of a manuscript so as to do double-sided copying or scanning on the manuscript.

(2) Two sets of stepping motors and deceleration gears are disposed on the automatic document feeder. It is mainly furnished with two sets of power; one is used to provide delivery power for the manuscript, and the other is to provide power to a transmission mechanism to turn the manuscript upside down.

(3) The forward and reverse rotations of a motor are used to achieve double-sided copying or scanning. First, a manuscript is delivered to do the front side copying or scanning through the forward rotation of the motor, then rollers are used to keep the manuscript at its tail part. The motor is switched to reverse rotation at that time to enable the paper to rotate back, and be delivered through another route to be turned over on the return trip so as to attain the double-sided copying and scanning.

Although the three devises mentioned above can provide double-sided copying or scanning, due to the fact that two optical structure sets or two driving devices are installed on the automatic document feeder, it is large in volume, high in manufacturing expenses and difficult to manufacture. Besides, the device, which drives the manuscript to process double-sided copying and scanning through forward and reverse rotations, has a complex motor driving circuit design, and the motor life is relatively short.

SUMMARY OF THE INVENTION

The objective of the invention is to provide an automatic document feeder capable of processing double-sided copying or scanning through only the single rotation of a motor and only one set of optical mechanisms and driving devices.

Accordingly, the invention provides an automatic document feeder. A delivery route that can feed a manuscript through a scanning area, a return route and guiding-out route respectively connected with the delivery route are disposed in the automatic document feeder. A feeding mechanism used to drive the manuscript to move in the routes is installed around every route, and a guiding element and first and second guiding plates are installed at the intersection of the routes. Thereby, the manuscript can come out of the exit to complete single-sided scanning after passing through the scanning area. Then, the manuscript can be guided into the return route by the guiding element and turned over to the other side, and guided back to the delivery route to pass through the scanning area again to process the second scanning. Finally, the manuscript is guided out of the exit and the process of the double-sided image capture is completed.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

THE DETAILED DESCRIPTION OF THE PREFERRED EMBODIMENTS

The automatic document feeder according to the invent can be combined with office machines (such as a copy machine, scanner, facsimile apparatus and the like) installed with an optical machine module (CIS or CCD module) to process single and double sided image scanning.

Figure 1:
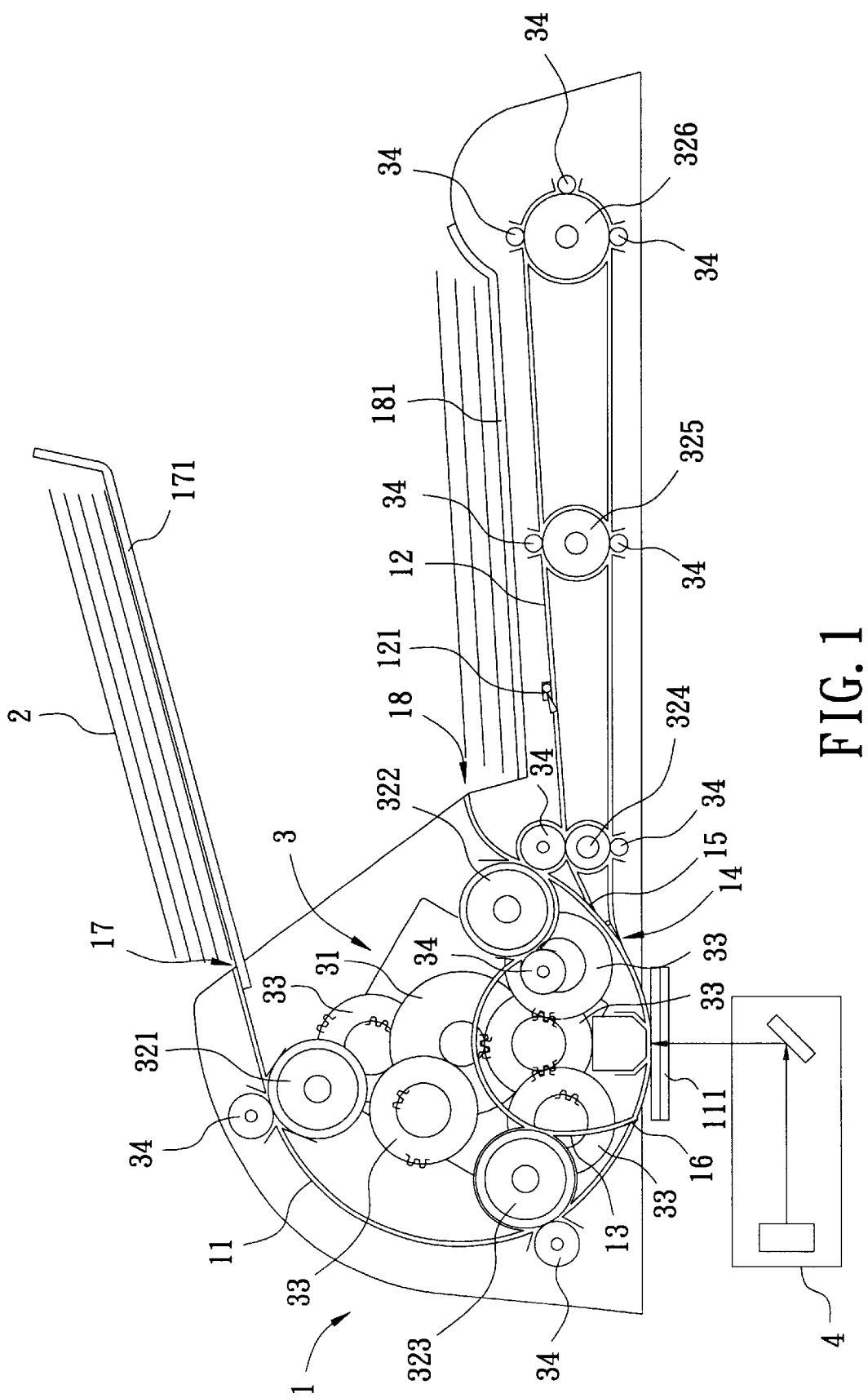
FIG. 1 is a schematic view of an automatic document feeder according to the invention.

First, please refer to FIG. 1, which shows an automatic document feeder of the preferred embodiment according to the invention. As the figure shows, an automatic document feeder 1 has a route that allows a manuscript 2 to be moved forward. The route comprises a delivery route 11, return route 12 and guiding-out route 13. A guiding element 14, first guiding plate 15 and second guiding plate 16 are respectively installed at the intersections of the delivery route 11, return route 12 and guiding-out route 13. A set of paper feeding mechanisms 3, which is used to drive the manuscript 2 to move in the routes, is installed around all routes.

The delivery route 11, return route 12, and guiding-out route 13 mentioned above are all smooth passages. The delivery route 11 is a passage passing through a scanning area in which an optical machine module can capture an image. The delivery route 11 has a paper inlet 17 and paper exit 18. A paper input drawer 171 and paper output drawer 181 are respectively installed at the ends thereof. The return route 12 and guiding-out route are passages respectively connected with the delivery route 11 to guide the manuscript 2 that enters the delivery route 11 and passes through the scanning area 111 from the return route 12 to the delivery route 11. The manuscript 2 is then turned over and passed through the scanning area 111, and then output to the paper exit 18 on the return route 12 through the guiding-out route 13.

The paper feeding mechanisms 3 are a plurality of driving wheels installed along the two sides of every route mentioned above. The rotating power of some or all driving wheels is transmitted by at least one motor 31. It causes the manuscript 2 to have surface contact with the driving wheels. As the figure shows, the driving wheels further can be classified as multiple roller wheels 321, 322, 323, 324, 325, and 326 driven by the output power of the motor 31. A plurality of driven wheels 33 transmits the output power of the motor 31 indirectly to every wheel 321, 322, 323, 324, 325, and 326. A plurality of idle wheels 34 is opposite to every roller wheel 321, 322, 323, 324, 325, and 326 and is installed at the other side of the delivery route 11 and return route 12. The roller wheels comprise a first roller wheel 321 and a second roller 322 installed at the paper inlet 17 and paper exit 18, and a plurality of roller wheels, such as the third, fourth, fifth and sixth roller wheels 323, 324,325 and 326, distributed at the delivery route 11, return route 12 and guiding-out route 13. Thereby, the manuscript 2 can be input from the paper inlet 17 and fed through the planned routes by roller wheels 321, 322, 323, 324, 325 and 326, then output from the paper exit 18.

Figure 2A:
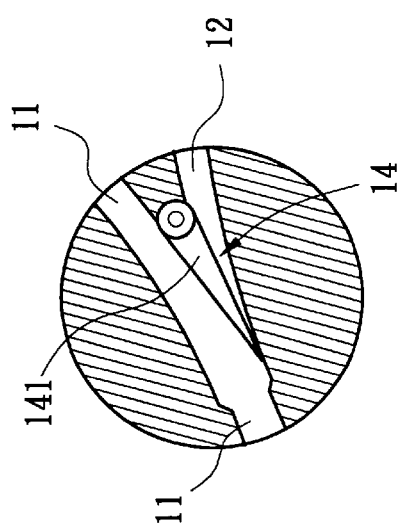
FIG. 2A is a partly enlarged schematic view of an automatic document feeder according to the invention, showing a guiding element at the first location where a return route is closed.
Figure 2B:
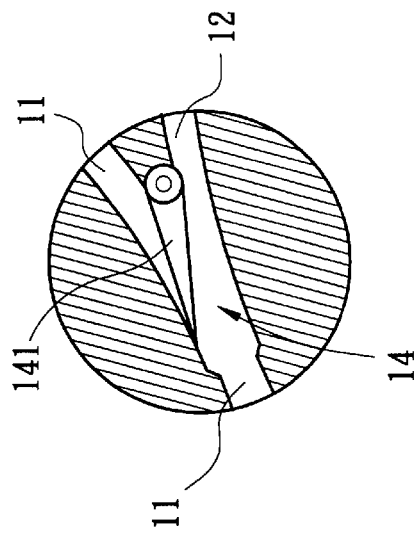
FIG. 2B is a partly enlarged schematic view of an automatic document feeder according to the invention, showing a guiding element at the second location where a return route is closed.

The guiding element 14 is disposed at the intersection of the delivery route 11 and return route 12. It can be moved to a first position that closes the return route 12, as shown in FIG. 2A, in order to output the manuscript 2 from the paper exit 18 directly, or to a second position that closes the delivery route 11, as shown in FIG. 2B, in order to guide the manuscript 2 into the return route 12 where it is turned over and then input to the delivery route 11 again to pass through the scanning area 111 and be guided to the delivery route 11 to output from the paper exit 18. The guiding element 14 can be an electromagnetic valve, as shown in FIGS. 2A and 2B. A guiding board 141 (such as a rigid plate) is disposed on the electromagnetic valve, and is switched to the first or second positions through the magnetization or demagnetization of an internal coil (not shown in the figure).

Figure 2C:
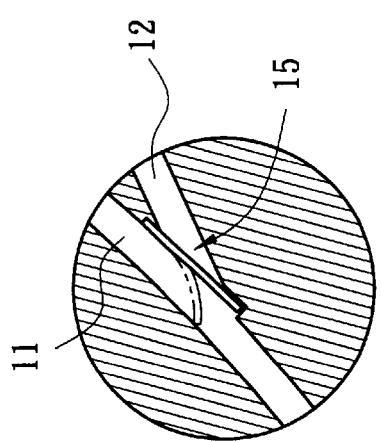
FIG. 2C is a partly enlarged schematic view of an automatic document feeder according to the invention, showing a first guiding plate at the intersection of a delivery route and return route.
Figure 2D:
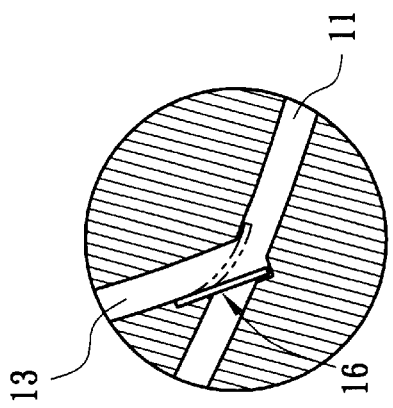
FIG. 2D is a partly enlarged schematic view of an automatic document feeder according to the invention, showing a second guiding plate at the intersection of a delivery route and guiding-out route.

The first and second guiding plates 15 and 16 (such as resilient Mylar plates) are installed at the intersections between the routes to provide the guiding effect for the manuscript 2. The first guiding plate 15 (as shown in FIG. 2C) and second guiding plate 16 (as shown in FIG. 2D) guide a manuscript 2 that enters the return route 12 back to pass through the route of the scanning area 111 again, and finally to be ejected out of the paper exit 18 via the guiding-out route 13.

Figure 3:
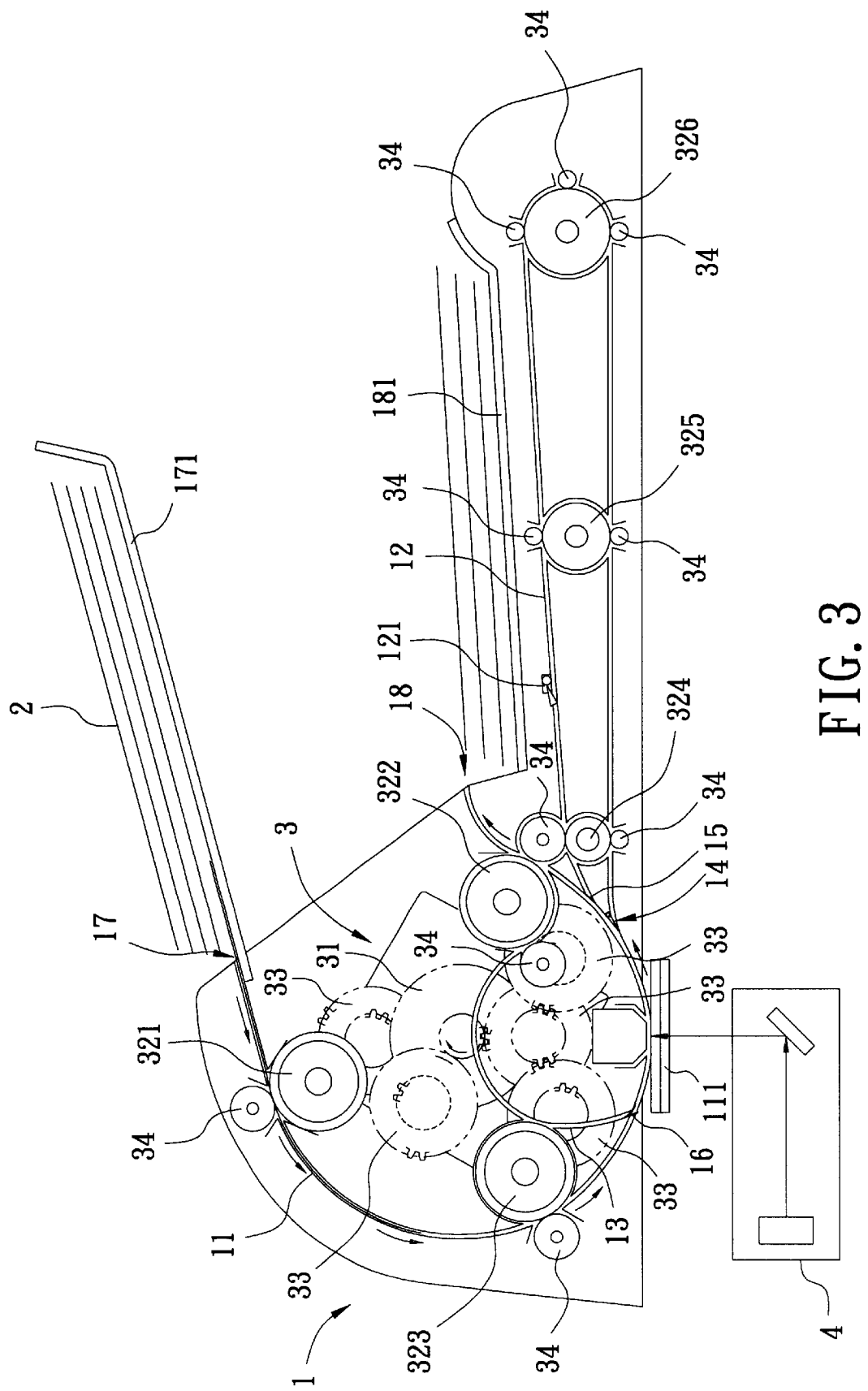
FIG. 3 is a schematic view of an automatic document feeder according to the invention, showing the action of single-sided scanning.
Figure 4:
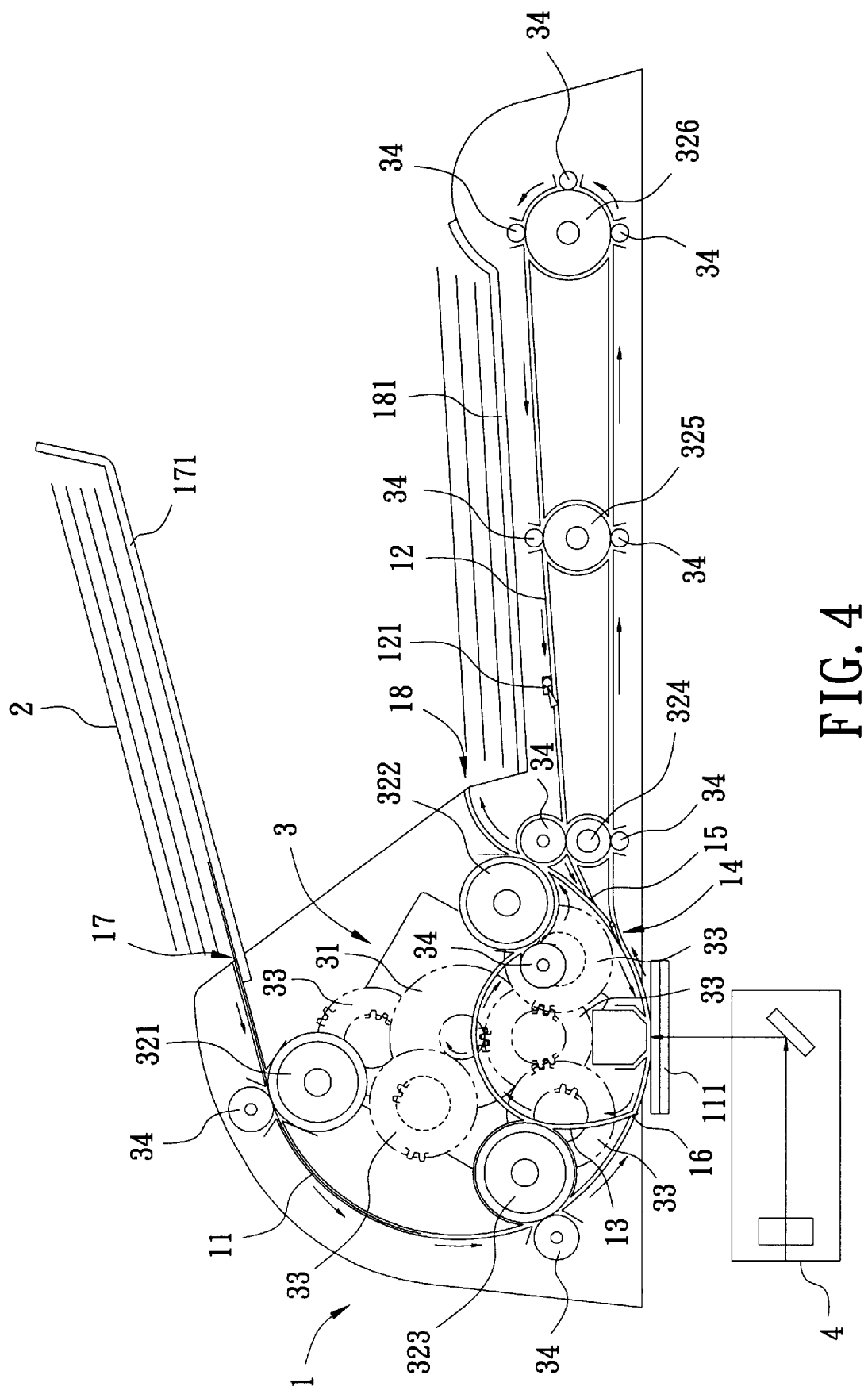
FIG. 4 is a schematic view of an automatic document feeder according to the invention, showing the action of double-sided scanning.

FIGS. 3 and 4 show the single-sided and double-sided scanning process of the automatic document feeder according to the invention.

First, please refer to FIG. 3. If a user operates the automatic document feeder to process single-sided scanning through software or a computer panel, the guiding element 14 is kept at the first position. The motor 31 soon drives the first roller wheel 321 to feed the manuscript 2 in the paper input drawer 171 into the delivery route. The manuscript 2 pushes the first guiding plate 15 away when it passes the third roller wheel 323 and arrives at the intersection of the delivery route 11 and the guiding-out route 13. It then follows the route to pass through the scanning area 111 to let the optical machine module 4 scan its surface. Then, the manuscript 2 passes through the guiding element 14 and is carried out of the paper exit 18 from the delivery route 11 by the second roller wheel 322 to arrive in the paper output drawer 181.

Next, refer to FIG. 4. If the user operates the automatic document feeder to process double-sided scanning through the software of a computer panel, the guiding element 14 is moved to the second position to let the manuscript 2 move into the return route 12 directly after passing through the scanning area 111. The manuscript 2 is moved by the fourth, fifth and sixth roller wheels 324, 325 and 326 to push away the second guiding plate 16 and be guided into the delivery route 11. Meantime, the manuscript 2 passes a sensor 121 installed in the return route 12 before it is guided into the delivery route. The sensor provides a signal to the guiding element 14 to move the guiding element back to the first position so that the manuscript 2 can be guided back into the delivery route 11 and moved backwards to pass through the scanning area 111 again to let the optical machine module capture the image of the other side of the manuscript 2. Thereafter, the first guiding plate 15 guides the manuscript 2 again into the guiding-out route 13. Finally, the manuscript 2 is switched into the delivery route and output out of the paper exit 18 to arrive in the paper output drawer 181.

The invention only uses one set of optical mechanisms and driving mechanisms plus a plurality of roller wheels. Thereby, the manufacturing cost can be reduced. The motor used in the invention only needs to rotate in one direction so that its life can be extended, and the circuit design can be simpler.

It is noted that the preferred embodiments of the invention are provided for the purpose of illustration only, and are not intended as a definition of the limits and scope of the invention disclosed. Any modifications and variations that may be apparent to a person skilled in the art are intended to be included within the scope of the invention.

What is claimed is:

1. An automatic document feeder, combined with an optical machine module for feeding a manuscript to pass through a scanning area that the optical machine module can capture image, comprising:

a delivery route being a passage that has a paper inlet and a paper exit therein and passing through the scanning area, and a paper output drawer installed by the paper exit, and guiding the manuscript passing through the scanning area;

a return route being a passage communicated with the delivery route and being arranged in an inner of the paper output drawer, and enabling the manuscript to be guided from the return route back to the delivery route after entering the delivery route and passing through the scanning area, and passing through the scanning area again;

a guiding-out route being a passage communicated with the delivery route for guiding the manuscript passing through the scanning area again and eventually leading out of the paper exit;

a paper feeding mechanism utilized to feed the manuscript from the paper inlet into the delivery route for outputting the manuscript from the paper exit;

a guiding element installed between the delivery route and the return route, and enabling to be moved to a first position that the manuscript can be output from the paper exit directly, and a second position that the manuscript can be guided into the return route in an alternative manner;

a sensor installed in the return route and sensing whether the manuscript passes to control the guiding element to be alternatively arranged at the first position and the second position;

a first guiding plate installed at an insertion that the return route guiding into the delivery route, and enabling the manuscript moved out of the return route to be guided back to the delivery route, and to pass through the scanning area again; and a second guiding plate installed at an insertion of the guiding-out route, and enabling the manuscript pass through the guiding-out route.

2. The automatic document feeder of claim 1, wherein the paper inlet installs a paper input drawer.

3. The automatic document feeder of claim 1, wherein the delivery route, return route and the guiding-out route are smooth passages.

4. The automatic document feeder of claim 1, wherein the paper feeding mechanisms includes at least six driving wheels installed along the delivery route and the return route.

5. The automatic document feeder of claim 4, wherein the driving wheels are provided the rotating power by a motor.

6. The automatic document feeder of claim 4, wherein the paper feeding mechanism includes a plurality of idle wheels relatively opposite to the driving wheels to carry the manuscript passed through therebetween.

7. The automatic document feeder of claim 1, wherein the guiding element is an electromagnetic valve.

8. The automatic document feeder of claim 7, wherein the electromagnetic valve installs a guiding board moved between the first and second positions by the magnetization or demagnetization of a coil of the electromagnetic valve.

9. The automatic document feeder of claim 8, wherein the guiding board is a rigid plate.

10. The automatic document feeder of claim 1, wherein the first and second guiding plates are resilient Mylar plate.

* * * * *